(12) United States Patent
Su et al.

(10) Patent No.: US 11,817,792 B2
(45) Date of Patent: Nov. 14, 2023

(54) SWITCHING-TYPE REGULATION DRIVER AND REGULATION DRIVING METHOD THEREOF

(71) Applicant: Joulwatt Technology Co., Ltd., Hangzhou (CN)

(72) Inventors: Zhiyong Su, Hangzhou (CN); Xiangyong Xu, Hangzhou (CN)

(73) Assignee: JOULWATT TECHNOLOGY CO., LTD., Hangzhou (CN)

( * ) Notice: Subject to any disclaimer, the term of this patent is extended or adjusted under 35 U.S.C. 154(b) by 91 days.

(21) Appl. No.: 17/515,382

(22) Filed: Oct. 29, 2021

(65) Prior Publication Data

US 2022/0140743 A1     May 5, 2022

(30) Foreign Application Priority Data

Oct. 30, 2020     (CN) .......................... 202011189366.X (51) Int. Cl.
*H02M 3/335*     (2006.01)

(52) U.S. Cl.
CPC .............................. *H02M 3/33592* (2013.01)

(58) Field of Classification Search
CPC .................................................. H02M 3/33592
See application file for complete search history.

(56) References Cited

U.S. PATENT DOCUMENTS

| | | | | |
|---|---|---|---|---|
| 9,991,810 B2* | 6/2018 | Choi | ....................... | H02M 1/08 |
| 10,079,547 B2* | 9/2018 | Kikuchi | ............ | H02M 3/33592 |
| 10,177,645 B2* | 1/2019 | Tao | ........................ | H02M 7/217 |
| 10,644,604 B2* | 5/2020 | Wong | ................. | H02M 3/33592 |
| 11,349,405 B2* | 5/2022 | Radic | ................. | H02M 3/33592 |
| 2006/0013022 A1* | 1/2006 | Jitaru | ....................... | H02M 1/38 |
| | | | | 363/21.12 |
| 2010/0327947 A1* | 12/2010 | Havanur | ............ | H02M 3/33592 |
| | | | | 327/434 |
| 2011/0096578 A1* | 4/2011 | Fang | ........................ | H03K 5/08 |
| | | | | 363/127 |

(Continued)

FOREIGN PATENT DOCUMENTS

| | | |
|---|---|---|
| CN | 212752133 U | 6/2020 |
| CN | 111786560 A | 10/2020 |

*Primary Examiner* — Kyle J Moody
(74) *Attorney, Agent, or Firm* — Treasure IP Group, LLC (57) ABSTRACT

A switching-type regulation driver includes a transformer, a controller, a synchronous rectifier and a drive control module. The drive control module is connected to the synchronous rectifier and the non-dotted terminal of the secondary winding respectively, and is used to detect a target parameter of a voltage across both power ends of the synchronous rectifier when the synchronous rectifier disconnects the conductive path between the non-dotted terminal of the secondary winding and the reference ground. When it is detected that the target parameter of the voltage across both power ends of the synchronous rectifier meets a preset condition, the controller controls a switching action of the first transistor so that the primary winding transmits power to the secondary winding. According to the present disclosure, the pre-stage chip may be matched with to realize a function of dynamic acceleration, and the dependence on the output pin may be reduced.

14 Claims, 3 Drawing Sheets

(56) References Cited

U.S. PATENT DOCUMENTS

| | | | |
|---|---|---|---|
| 2012/0300520 A1* | 11/2012 | Ren .................. | H02M 3/33592 363/127 |
| 2014/0003097 A1* | 1/2014 | Sakurai ............. | H02M 3/33592 363/21.14 |
| 2014/0204624 A1* | 7/2014 | Djenguerian ..... | H02M 3/33523 363/21.12 |
| 2017/0149340 A1* | 5/2017 | Ye ..................... | H02M 3/33523 |
| 2017/0353099 A1* | 12/2017 | Yang ....................... | H02M 1/08 |
| 2018/0076724 A1* | 3/2018 | Sugawara ......... | H02M 3/33592 |
| 2018/0183342 A1* | 6/2018 | Strijker ............ | H02M 3/33592 |
| 2018/0226897 A1* | 8/2018 | Kong ................ | H02M 3/33592 |
| 2022/0376629 A1* | 11/2022 | Xu ................... | H02M 3/33523 |

* cited by examiner

SWITCHING-TYPE REGULATION DRIVER AND REGULATION DRIVING METHOD THEREOF

CROSS-REFERENCE TO RELATED APPLICATION

This application claims priority to the Chinese Patent Application No. 202011189366.X, filed on Oct. 30, 2020 and entitled "SWITCHING-TYPE REGULATION DRIVER AND REGULATION DRIVING METHOD THEREOF", which are incorporated herein by reference in its entirety in this disclosure.

BACKGROUND OF THE DISCLOSURE

Field of Technology

The present disclosure relates to the technical field of power supplies, in particular to a switching-type regulation driver and a regulation driving method thereof.

Description of the Related Art

Different electric/electronic devices work under specific operating voltages. For example, Integrated Circuits (ICs) are normally powered by 5V, 3V or 1.8V, while high-voltage devices require 110V or 220V alternating current from the mains supply. In particular, light-emitting diode (LED) display tubes require to be operated at higher operating voltages. Therefore, various power supply converters have been developed to meet different requirements.

The power supply converters includes SSR (Secondary side regulation) and PSR (Primary side regulation). In PSR applications, the secondary output voltage can only be captured at 2-3 us after the beginning of the secondary demagnetization. In no-load state, after demagnetization and resonance, it is usually necessary to conduct a light turn-on every few ms or tens of ms to detect the output voltage. If it is turned on frequently, a floating of the output voltage may be caused, and thus a power dissipation of a false load needs to be increased to reduce the efficiency. Therefore, when the output is suddenly loaded during the no-load period, the output voltage will suddenly be lowered, and cannot be fed back to the primary side in time. If the output voltage information is detected in a switching cycle through the auxiliary winding, the output voltage cannot be detected in real time. When the load is very light, the switching frequency can be as low as several hundred Hz. When switching from no-load to full-load under this condition, it needs to take 1-2 cycles (up to several ms) for the pre-stage chip to detect the output voltage. During this period, energy cannot be transmitted to the output, and the output voltage will drop to a low level or even 0V due to the consumption of the load.

In order to solve the above problems, a conventional approach is to directly detect the output voltage information. When the output voltage is lower than a set threshold, the relevant signal is transmitted to the pre-stage chip through an auxiliary winding. After the pre-stage chip receives the relevant signal, a drive signal is immediately sent to transmit power to the output, so as to avoid a drop of the output voltage as much as possible. However, direct detection of output voltage requires setting a specific output voltage feedback pin, which is not conducive to the miniaturization of the driver.

Therefore, it is necessary to provide an improved technical solution to overcome the above technical problems existing in the prior art.

SUMMARY OF THE INVENTION

In order to solve the above technical problem, the present disclosure provides a switching-type regulation driver and a regulation driving method thereof, which indirectly samples the information of the output voltage by detecting the voltage across both power ends of the synchronous rectifier, so that the pre-stage chip is matched with to realize a function of dynamic acceleration, and the dependence on the output pin is reduced.

In one aspect according to the present disclosure, a switching-type regulation driver is provided, which comprises: a transformer having a primary winding and a secondary winding; a first transistor, wherein a first power end of the first transistor is connected to a dotted terminal of the primary winding, and a second power end of the first transistor is connected to a reference ground through a current sensing resistor; a controller connected to a control end and the second power end of the first transistor respectively, wherein the controller generates a first control signal to the control end of the first transistor; a synchronous rectifier connected between a non-dotted terminal of the secondary winding and the reference ground; a drive control module, connected to a control end of the synchronous rectifier and the non-dotted terminal of the secondary winding respectively. The drive control module is used to detect a target parameter of the voltage across both power ends of the synchronous rectifier when the synchronous rectifier disconnects a conductive path between the non-dotted terminal of the secondary winding and the reference ground, and when it is detected that the target parameter of the voltage across both power ends of the synchronous rectifier meets a preset condition, the controller controls a switching action of the first transistor so that the primary winding transmits power to the secondary winding.

Optionally, the switching-type regulation driver further includes an auxiliary winding. A voltage signal at both ends of the auxiliary winding is divided by a voltage dividing resistor to generate a voltage dividing signal, and the voltage dividing signal is transmitted to the controller. The controller controls the switching action of the first transistor according to information of the voltage dividing signal.

Optionally, the switching-type regulation driver further includes an input capacitor and an output capacitor. One end of the input capacitor is connected to the non-dotted terminal of the primary winding, and the other end of the input capacitor is connected to the reference ground. One end of the output capacitor is connected to the dotted terminal of the secondary winding, and the other end the output capacitor is connected to the reference ground.

Optionally, the drive control module includes: a second transistor and a first resistor, a sampling unit and a drive control unit. The second transistor and the first resistor are successively connected in series between the non-dotted terminal of the secondary winding and the reference ground. The sampling unit is connected to the non-dotted terminal of the secondary winding and used to sample a voltage between the both power ends of the synchronous rectifier to obtain the voltage across both power ends of the synchronous rectifier. The drive control unit is connected to the sampling unit, the control end of the synchronous rectifier and the control end of the second transistor respectively, and is used to provide a second control signal to the synchronous rectifier, and to provide a third control signal to the second transistor according to the voltage across both power ends of the synchronous rectifier.

Optionally, the drive control unit includes a control signal generator and a driver. The control signal generator includes a first output end for providing the second control signal and a second output end for providing the third control signal. The driver is connected between the first output end of the control signal generator and the control end of the synchronous rectifier.

Optionally, the target parameter of the voltage across both power ends of the synchronous rectifier is a voltage amplitude of the voltage across both power ends of the synchronous rectifier, and the preset condition is that the voltage amplitude is lower than or equal to a first threshold.

Optionally, the first threshold is a preset fixed value, or the first threshold is adaptively adjusted following the voltage across both power ends of the synchronous rectifier.

Optionally, when the first threshold is adaptively adjusted following the voltage across both power ends of the synchronous rectifier, the drive control module further includes a sampling filter holding unit and a proportion adjustment unit. The sampling filter holding unit is connected to the non-dotted terminal of the secondary winding to sample the voltage between the both power ends of the synchronous rectifier, and to obtain an average value of the voltage across both power ends of the synchronous rectifier after sampling filter. The proportion adjustment unit is connected to the sampling filter holding unit and the drive control unit respectively, to obtain the first threshold according to the average value of the voltage across both power ends of the synchronous rectifier and a preset proportionality coefficient. The first threshold is the product of the average value and the preset proportionality coefficient. The preset proportionality coefficient is recorded as K %, and K is greater than or equal to 80 and less than 100.

Optionally, the target parameter of the voltage across both power ends of the synchronous rectifier is a falling slope of the voltage across both power ends of the synchronous rectifier, and the preset condition is that the falling slope is greater than a second threshold.

Optionally, the drive control module further includes a timing unit. The timing unit is connected to the drive control unit for re-timing every time a rising edge of the second control signal is detected, and is used to trigger the drive control module to detect the target parameter of the voltage across both power ends of the synchronous rectifier when a timing value reaches a third threshold.

Optionally, the switching-type regulation driver further comprises a second resistor, a first capacitor and a first diode. The second resistor and the first capacitor are connected in parallel between the non-dotted terminal of the primary winding and the cathode of the first diode, and the anode of the first diode is connected to the dotted terminal of the primary winding.

Optionally, the first transistor, the synchronous rectifier and the second transistor are NMOS transistors.

In another aspect according to the present disclosure, a switching power supply is provided, which includes a switching-type regulation drive circuit as described above.

In another aspect according to the present disclosure, a switching-type regulation driving method is provided, which is applied to the switching-type regulation driver as described above, and particularly includes: enabling a first current signal to flow through the primary winding of a transformer, and forming a second current signal at a secondary winding of the transformer based on a first control signal; inputting a second control signal to a control end of the synchronous rectifier, and adjusting the second current signal by the synchronous rectifier to form an output signal. The method further includes: detecting a target parameter of the voltage across both power ends of the synchronous rectifier, and controlling the primary winding to transmit power to the secondary winding when it is detected that the target parameter of the voltage across both power ends of the synchronous rectifier meets the preset condition.

Optionally, detecting the target parameter of the voltage across both power ends of the synchronous rectifier, and controlling the primary winding to transmit power to the secondary winding when it is detected that the target parameter of the voltage across both power ends of the synchronous rectifier meets the preset condition includes: detecting a voltage amplitude of the voltage across both power ends of the synchronous rectifier, and controlling the primary winding to transmit power to the secondary winding when it is detected that the voltage amplitude of the voltage across both power ends of the synchronous rectifier is lower than or equal to a first threshold.

Optionally, detecting a target parameter of the voltage across both power ends of the synchronous rectifier, and controlling the primary winding to transmit power to the secondary winding when it is detected that the target parameter of the voltage across both power ends of the synchronous rectifier meets a preset condition includes: detecting a falling slope of the voltage across both power ends of the synchronous rectifier, and controlling the primary winding to transmit power to the secondary winding when it is detected that the falling slope of the voltage across both power ends of the synchronous rectifier is greater than a second threshold.

Optionally, controlling the primary winding to transmit power to the secondary winding includes: generating a third control signal having a first frequency, and forming a third current signal at the secondary winding based on the third control signal; forming an induced current at [[the]] an auxiliary winding of the transformer based on the third current signal, and forming a trigger signal to the controller based on the induced current; triggering the controller by the trigger signal to control a current circuit where the primary winding is located to be turned on, and transmitting power to the secondary winding.

Optionally, prior to detecting the target parameter of the voltage across both power ends of the synchronous rectifier, the method further includes: detecting a rising edge of the second control signal, and re-timing every time the rising edge of the second control signal is detected; triggering to detect the target parameter of the voltage across both power ends of the synchronous rectifier when a timing value reaches a third threshold.

The beneficial effects of the present disclosure are that according to the switching-type regulation driver and a regulation driving method thereof provided in the present disclosure, a drive control module is provided at the secondary winding end of the driver, and is used to detect the target parameter of the voltage across the both power ends of the synchronous rectifier. In this way, a purpose of indirectly sampling the output voltage information may be achieved, so that the pre-stage chip may be matched with to realize a function of dynamic acceleration, to prevent the output voltage from dropping, and the dependence on the output pin may be reduced, even the number of the output pins may be saved.

By adaptively adjusting the first threshold following the voltage across both power ends of the synchronous rectifier, the dynamic response can be accelerated and the output voltage can be prevented from falling too much when the output voltage fluctuation is relatively large and the gap from the first threshold is also large.

By using of a timing unit to re-time after detecting the rising edge of the second control signal and to detect the target parameter when the timing value reaches a third threshold, the accuracy and reliability of the detection can be improved.

It should be noted that the above general descriptions and the following detailed descriptions are only exemplary and explanatory and do not limit the protection scope of the present disclosure.

BRIEF DESCRIPTION OF THE DRAWINGS

The above and other objectives, features and advantages of the present disclosure will become more apparent from the description of embodiments of the present disclosure below with reference to the accompanying drawings.

DETAILED DESCRIPTION OF THE DISCLOSURE

Various embodiments of the present disclosure will be described in more detail below with reference to the accompanying drawings. The preferred embodiments of the present disclosure will be described in detail below with reference to the accompanying drawings. However, the present disclosure is not limited to these embodiments. The present disclosure covers any replacement, modification, and equivalent methods and solutions made within the spirit and scope of the present disclosure.

To enable the public to have a thorough understanding of the present disclosure, specific details are described in the following preferred embodiments of the present disclosure, and persons skilled in the art can fully understand the present disclosure without the description of these details.

The following describes the present disclosure in more detail by using examples and with reference to the accompanying drawings. It should be noted that the accompanying drawings all adopt very simplified forms and all use imprecise ratios, which are used only for the purpose of conveniently and clearly assisting in describing the embodiments of the present disclosure.

The specific implementation of the present disclosure will be further described in detail with reference to accompanying drawings and in conjunction with the embodiments.

Figure 1:
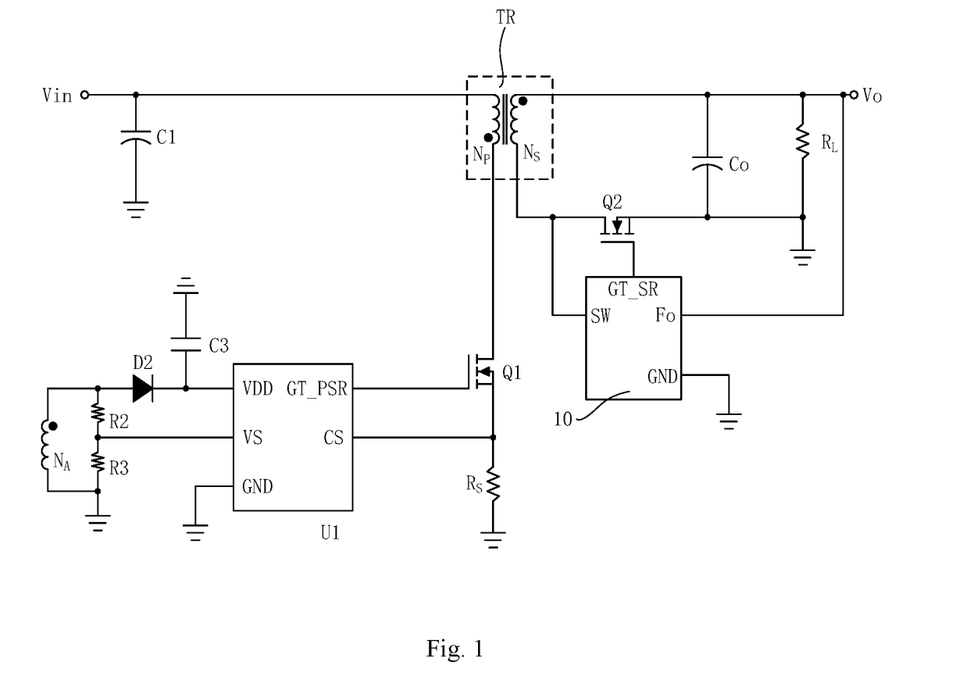
FIG. 1 shows a circuit structural schematic diagram of a switching-type regulation driver in prior art.

FIG. 1 shows a circuit structural schematic diagram of a switching-type regulation driver in prior art.

As shown in FIG. 1, a switching regulator driver includes a transformer TR, an input capacitor C1, a first transistor Q1, a current sensing resistor $R_S$, a controller U1, a synchronous rectifier Q2, an output capacitor Co, and a drive controller 10. Transformer TR includes a primary winding $N_P$, a secondary winding $N_S$ and an auxiliary winding $N_A$. One end of the input capacitor C1 receives an input voltage Vin and is connected to the non-dotted terminal of the primary winding $N_P$, and the other end of the input capacitor C1 is connected to the reference ground. A first power end of the first transistor Q1 is connected to the dotted terminal of the primary winding $N_P$, and a second power end of the first transistor Q1 is connected to the reference ground through the current sensing resistor $R_S$. One end of the output capacitor Co is connected to the dotted terminal of the secondary winding $N_S$, and the other end of the output capacitor Co is connected to the reference ground. Both ends of the output capacitor Co are connected in parallel with the equivalent load RL. The synchronous rectifier Q2 is connected between the non-dotted terminal of the secondary winding $N_S$ and the reference ground. The first transistor Q1 is, for example, an NMOS transistor.

The drive controller 10 includes: GT_SR (second control signal output) pin, GND (reference ground) pin, Fo (output voltage detection) pin and SW (feedback regulation) pin. The GT_SR pin is connected to a control end of the synchronous rectifier Q2. The GND pin is connected to the reference ground. The Fo pin is connected to an output end of the DC output voltage Vo. The SW pin is connected to the non-dotted terminal of the secondary winding $N_S$.

The controller U1 includes but is not limited to: VDD (supply voltage input) pin, GND (reference ground) pin, GT_PSR (gate drive output) pin, CS (current sensing input) pin and VS (voltage sensing input) pin. The VDD pin is connected to the dotted terminal of the auxiliary winding $N_A$ via a voltage regulator (including a second diode D2 and a third capacitor C3). The GND pin is connected to the reference ground. The GT_PSR pin is connected to a control end of the first transistor Q1. The CS pin is connected to a connection node between the first transistor Q1 and the current sensing resistor $R_S$. The VS pin is connected to a connection node of a voltage divider (including a third resistor R2 and a fourth resistor R3), and the voltage divider is connected between the dotted terminal of the auxiliary winding $N_A$ and the non-dotted terminal of the auxiliary winding $N_A$.

When the controller U1 controls the first transistor Q1 to turn on, the input voltage Vin passes through the primary winding $N_P$ of the transformer TR, the first transistor Q1 and the current sensing resistor $R_S$ to the reference ground to form a current loop, wherein the primary winding $N_P$ of the transformer TR begins to store energy, and an induced negative voltage is formed at the auxiliary winding $N_A$. The VS pin of the controller U1 senses a slightly negative/positive potential, and a current sensing signal captured from the current sensing resistor $R_S$ is fed into the CS pin of the controller U1. When the controller U1 controls that the first transistor Q1 is turned off and the synchronous rectifier Q2 at the $N_S$ end of the secondary winding is turned on, the primary winding $N_P$ of the transformer TR begins to release energy, and is converted into a DC output voltage Vo at both ends of the output capacitor Co, so that some devices that require DC power can operate. At that time, the VS pin of the controller U1 senses a proportionally reduced positive voltage for switching-type regulation, and the CS pin of the controller U1 does not receive a current sensing signal. Further, the controller U1 can obtain a current load state by combining the voltage sensing signal received by the controller's VS pin and the current sensing signal received by the controller's CS pin.

In case the DC output voltage Vo is detected by the switching-type regulation driver circuit shown in FIG. 1, the information of the output voltage can only be directly detected through the Fo pin of the drive controller 10. When the output voltage is lower than the set threshold, the voltage or current at the secondary winding $N_S$ is regulated by feedback through the SW pin, and relevant signal is further transmitted to the pre-stage chip through the auxiliary winding. After receiving the relevant signal, the pre-stage chip immediately sends a drive signal to transmit power to the output, so that a drop of the output voltage may be avoided as much as possible. Since the detection must be implemented at the output end of the driver, the dependence on the Fo pin of the drive controller 10 will be higher, which is not conducive to the miniaturization of the driver.

Figure 2:
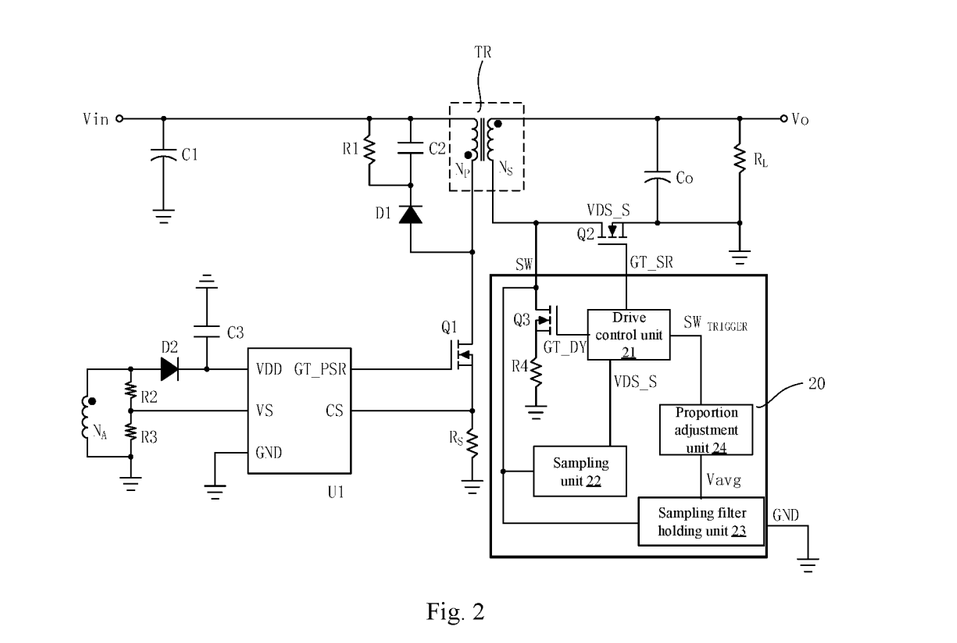
FIG. 2 shows a circuit structural schematic diagram of a switching-type regulation driver according to an embodiment of the present disclosure.
Figure 3:
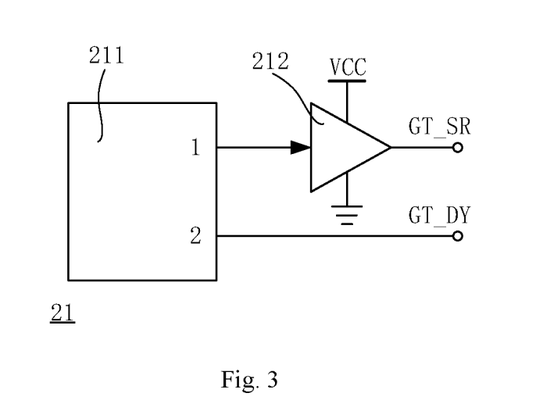
FIG. 3 shows a circuit structural schematic diagram of a drive control unit in a switching-type regulation driver according to an embodiment of the present disclosure.
Figure 4A:
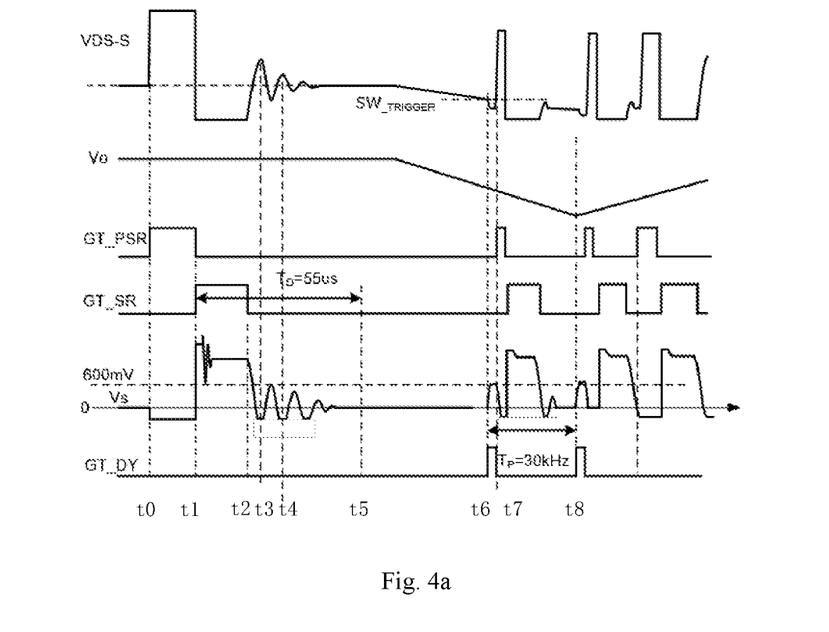
FIGS. 4a and 4b show signal waveform schematic diagrams of switching-type regulation drivers provided by embodiments of the present disclosure respectively.
Figure 4B:
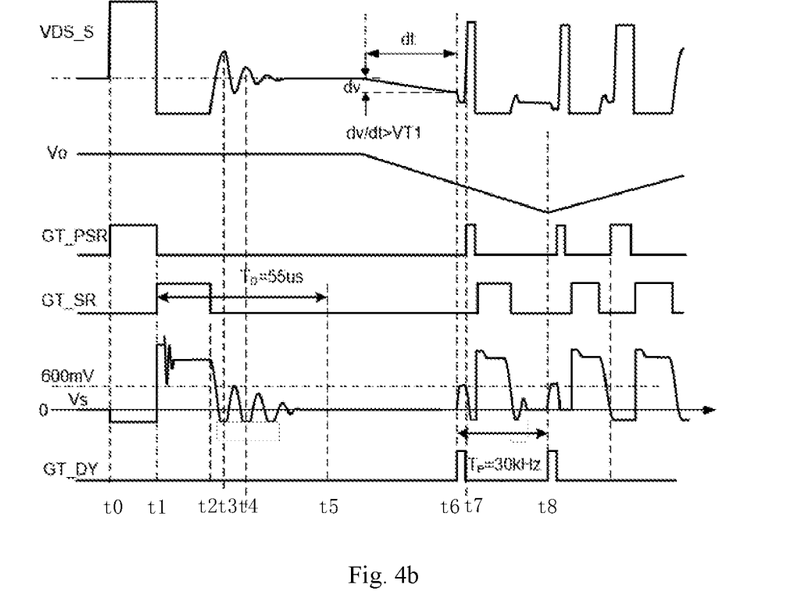

Based on this, the present disclosure provides an improvement on the basis of the circuit shown in FIG. 1 to overcome the above technical problem. The circuit structure of the improved switching-type regulation driver is shown in FIGS. 2 and 3. In the improved switching-type regulation driver shown in FIG. 2, the same circuit structure as that of the switching-type regulation driver shown in FIG. 1 can be referred to the description of FIG. 1, and will not be repeated herein. FIG. 2 shows a circuit structural schematic diagram of a switching-type regulation driver according to an embodiment of the present disclosure. FIG. 3 shows a circuit structural schematic diagram of a drive control unit in a switching-type regulation driver according to an embodiment of the present disclosure. FIGS. 4a and 4b show signal waveform schematic diagrams of switching-type regulation drivers provided by embodiments of the present disclosure, respectively.

As shown in FIG. 2, in this embodiment, the switching-type regulation driver includes a drive control module 20. The drive control module 20 includes GT_SR (second control signal output) pin, GND (reference ground) pin and SW (feedback regulation) pin. The GT_SR pin is connected to a control end of the synchronous rectifier Q2, the GND pin is connected to the reference ground, and the SW pin is connected to the non-dotted terminal of the secondary winding $N_S$.

The drive control module 20 is used to detect a target parameter of the voltage across both power ends of the synchronous rectifier Q2 through the SW pin when the synchronous rectifier Q2 disconnects the conductive path between the non homonymous end dotted terminal of the secondary winding $N_S$ and the reference ground. When it is detected that the target parameter of the voltage across both power ends of the synchronous rectifier Q2 meets a preset condition, the controller U1 controls the switching actions of the first transistor Q1 so that the primary winding $N_P$ transmits power/energy to the secondary winding $N_S$. In the present disclosure, a voltage sampling detection and a feedback regulation are both realized on the basis of the SW pin of the drive control module 20, so that there is no need to set an additional output voltage feedback pin, thereby saving the number of pins.

Furthermore, in this embodiment, the first power end of the synchronous rectifier Q2 is connected to the non-dotted terminal of the secondary winding $N_S$, and the second power end of the synchronous rectifier Q2 is connected to the reference ground. The control end of the synchronous rectifier Q2 is connected to the drive control module 20 to receive a second control signal GT_SR. The synchronous rectifier Q2 is, for example, an NMOS transistor. The synchronous rectifier (NMOS transistor) is used as a rectifier to synchronously rectify the current of the secondary winding, so that the rectification loss may be reduced.

It should be understood that when the load RL is light, the switching frequency of the first transistor Q1 and of the synchronous rectifier Q2 is relatively low, for example several 100 Hz or kHz. After a few resonance cycles, the voltage across both power ends of the synchronous rectifier Q2 (i.e. the source-drain voltage of the synchronous rectifier Q2) VDS_S is approximately equal to the output voltage Vo. When the load RL is momentarily switched from light-load to heavy-load, the voltage VDS_S at both power ends of the synchronous rectifier Q2 drops synchronously with the drop of the output voltage Vo. Therefore, according to the present disclosure, the detection of the target parameter of the voltage VDS_S at both power ends of the synchronous rectifier, is approximately equal to the detection of the output voltage Vo, further achieving that the information of the output voltage Vo can be indirectly sampled, so that a dynamic acceleration can be realized by matching with the pre-stage chip, the output voltage drop is avoided, the dependence on the output feedback pin is lowered, and thusly the number of pins of the chip is reduced.

Furthermore, in the present embodiment, the drive control module 20 includes a second transistor Q3, a first resistor R4, a sampling unit 22 and a drive control unit 21. The second transistor Q3 and the first resistor R4 are sequentially connected in series between the non-dotted terminal of the secondary winding $N_S$ and the reference ground. The sampling unit 22 is connected to the non-dotted terminal of the secondary winding $N_S$ to sample the voltage between the both power ends of the synchronous rectifier Q2, to obtain the voltage VDS_S at both power ends of the synchronous rectifier. The drive control unit 21 is connected to the sampling unit 22, a control end of the synchronous rectifier Q2 and a control end of the second transistor Q3, respectively, to provide a second control signal GT_SR to the synchronous rectifier Q2, and to provide a third control signal GT_DY to the second transistor Q3 on the basis of the voltage VDS_S at both power ends of the synchronous rectifier. The second transistor Q3 is, for example, an NMOS transistor.

For example, as shown in FIG. 3, the drive control unit 21 includes a control signal generator 211 and a driver 212. The control signal generator 211 includes a first output end 1 for providing a second control signal GT_SR, and a second output end 2 for providing the third control signal GT_DY. The driver 212 is connected between the first output end 1 of the control signal generator 211 and the control end of the synchronous rectifier Q2, and works based on the power supply VCC and the reference ground. When the second control signal GT_SR generated by the control signal generator 211 is a digital signal, it can be converted into an analog signal through the driver 212 and then be output to the synchronous rectifier Q2, so as to realize the drive control to the synchronous rectifier Q2 in a better way. Similarly, a same driver can also be arranged between the second output end 2 of the control signal generator 211 and the control end of the second transistor Q3.

In an embodiment according to the present disclosure, the target parameter of the voltage VDS_S at both power ends of the synchronous rectifier Q2 is the voltage amplitude of the voltage VDS_S at both power ends of synchronous rectifier, and the preset condition needed to be met is that the voltage amplitude of the voltage VDS_S at both power ends of the synchronous rectifier shall be less than or equal to a first threshold. Referring to FIG. 4A, when the switching-type regulation driver works normally, the drive frequency of the first control signal GT_PSR and of the second control signal GT_SR are normal. The normal work of the switching-type regulation driver is generally understood that during the time t0-t1, the first control signal GT_PSR is at a high level, the first transistor Q1 is controlled to be turned on, and an induced negative voltage generates on the auxiliary winding $N_A$. At the meantime, the second control signal GT_SR is controlled to be at a low level, the synchronous rectifier Q2 is turned off, and the voltage VDS_S at both power ends of the synchronous rectifier is greater than the output voltage Vo. During the time t1-t2, the first control signal GT_PSR is at a low level, the first transistor Q1 is turned off, and the second control signal GT_SR is at a high level, the synchronous rectifier Q2 is turned on, the output voltage Vo passes through the secondary winding $N_S$ and the synchronous rectifier Q2 to the reference ground to form a conduction loop, and the voltage VDS_S at both power ends of the synchronous rectifier Q2 becomes negative. At this time, an induced voltage on the basis of the secondary winding $N_S$ formed at both ends of the auxiliary winding $N_A$ is sensed and detected by the VS pin of the controller U1. From time t2, after several resonance cycles (including time t2, t3 and t4), the voltage VDS_S at both source and drain ends of the synchronous rectifier Q2 is approximately equal to the output voltage Vo. Since the first control signal GT_PSR and the second control signal GT_SR is in a low-level state within a certain time, the voltage amplitude of the output voltage Vo and of the voltage VDS_S at both source and drain ends of the synchronous rectifier Q2 begin to decrease gradually. At this time, the voltage amplitude of the voltage VDS_S at both source and drain ends of the synchronous rectifier Q2 is detected. At time T6, when the voltage amplitude of the voltage VDS_S is lower than or equal to the first threshold $SW_{\_TRIGGER}$, the drive control module 20 begins to output the third control signal GT_DY with a first frequency. During the time t6-t7, the third control signal GT_DY is at a high level, the second transistor Q3 is turned on, the output voltage Vo passes through the secondary winding $N_S$, the second transistor Q3 and the first resistor R4 to the reference ground to form conduction loop, and again an induced voltage is formed at both ends of the auxiliary winding $N_A$, and the voltage across the VS pin of the controller U1 rises. When sensing that a voltage signal exceeds a threshold (e.g. 600 mV), at time t7, the controller U1 is triggered to start providing the first control signal GT_PSR, and further to control the primary winding $N_P$ to transmit power/energy to the secondary winding $N_S$, so that the voltage amplitude of the output voltage Vo begins to increase (such as at time t8), to prevent the output voltage Vo from falling even lower.

It should be understood that in this embodiment, the drive control module 20 (such as the drive control unit 21 of the drive control module 20) is provided with a corresponding first detection unit, which is used for comparing the voltage amplitude of the voltage VDS_S with that of the first threshold $SW_{\_TRIGGER}$ after time t5. When the voltage amplitude of the voltage VDS_S is lower than or equal to the first threshold $SW_{\_TRIGGER}$, a corresponding control signal is output to the control signal generator 211, and further the control signal generator 211 is triggered to generate the third control signal GT_DY.

In the present disclosure, the first threshold is a preset fixed value, or the first threshold is adaptively adjusted following the voltage VDS_S at both power ends of the synchronous rectifier. When the first threshold is adaptively adjusted following the voltage VDS_S at both power ends of the synchronous rectifier, the drive control module 20 further includes a sampling filter holding unit 23 and a proportion adjustment unit 24. The sampling filter holding unit 23 is connected to the non-dotted terminal of the secondary winding $N_S$ to sample the voltage between the both power ends of the synchronous rectifier, and obtain an average value $V_{avg}$ of the voltage across both power ends of the synchronous rectifier after sampling filter. The proportion adjustment unit 24 is connected to the sampling filter holding unit 23 and the drive control unit 21 respectively, to obtain the first threshold $SW_{\_TRIGGER}$ according to the average value $V_{avg}$ of the voltage across both power ends of the synchronous rectifier and a preset proportionality coefficient. The first threshold $SW_{\_TRIGGER}$ is the product of the average value $V_{avg}$ and the preset proportionality coefficient, which is recorded as K %, wherein K may be greater than or equal to 80 and less than 100.

Furthermore, after comparing the voltage amplitude of the voltage VDS_S at both power ends of the synchronous rectifier, which is obtained by the drive control unit 21 (in this embodiment, if the first detection unit is arranged within the drive control unit 21, that is, by the first detection unit) receiving the sampling result from the sampling unit 22, with the corresponding first threshold $SW_{\_TRIGGER}$, a corresponding control signal is output to the control signal generator 211 according to the comparison result. When the fluctuation of the output voltage is relatively high and the gap to the first threshold is also large, due to the corresponding comparison threshold provided for different level states of the output voltage, the dynamic response speed can be accelerated to prevent the output voltage from falling too much.

In another embodiment of the present disclosure, referring to FIG. 4b, the similarities between FIG. 4b and FIG. 4a shall be understood by referring to the description of FIG. 4a, which will not be repeated herein. The difference is that in this embodiment, the target parameter of the voltage VDS_S at both power ends of the synchronous rectifier is a falling slope of the voltage VDS_S at both power ends of the synchronous rectifier, and the preset condition needed to be met is that the falling slope of the voltage VDS_S at both power ends of the synchronous rectifier is greater than a second threshold. Based on this, the drive control module 20 is provided with a corresponding second detection unit, which is used to detect the falling slope of the amplitude of the voltage VDS_S (for example, recorded as dv/dt herein). When the falling slope is greater than the second threshold VT1, a corresponding control signal is output to the control signal generator 211, and then the control signal generator 211 is triggered to generate a third control signal GT_DY. According to similar principle as above, the second threshold is a preset fixed value, or the second threshold is adaptively adjusted following the falling slope of the voltage across both power ends of the synchronous rectifier.

Furthermore, the drive control module 20 further includes a timing unit. The timing unit is connected to the drive control unit 21 for re-timing every time a rising edge of the second control signal GT_SR is detected. When the timing value reaches the third threshold (for example at time t5 in FIG. 4a and FIG. 4b), the drive control module 20 is triggered to detect the target parameter of the voltage VDS_S at both power ends of the synchronous rectifier Q2. Thusly, the accuracy and reliability of the detection to the voltage VDS_S can be improved, and a false triggering of the third control signal during the normal working time of other drivers can be avoided.

It should be understood that as marked in FIGS. 4a and 4b, the third threshold TD is 55 us, the frequency of the third control signal GT_DY is 30 kHz, and the voltage Vs is 600 mV, however, these are only exemplary embodiments serving as an auxiliary description of the present disclosure, which are not intending to a limit the protection scope of the present disclosure. Meanwhile, it should be noted that the frequency of the third control signal GT_DY and the frequency of the first control signal GT_PSR, which are generated through triggering after the output voltage Vo drops, should be lower than the initial frequency of the first control signal GT_PSR correspondingly, that is, the normal driving frequency. Therefore, the technical solution recorded in the present disclosure will not affect the normal operation of the switching-type regulation driver.

Furthermore, in this embodiment, a second resistor R1, a first capacitor C2 and a first diode D1 are arranged between the dotted terminal and the non-dotted terminal of the primary winding $N_P$ of the transformer TR. The second resistor R1 and the first capacitor C2 are connected in parallel between the non-dotted terminal of the primary winding $N_P$ and the cathode of the first diode D1, and the anode of the first diode D1 is connected to the dotted terminal of the primary winding $N_P$. Thusly, the leakage inductance current of the primary winding $N_P$ can be absorbed and the performance of the transformer is improved.

Figure 5:
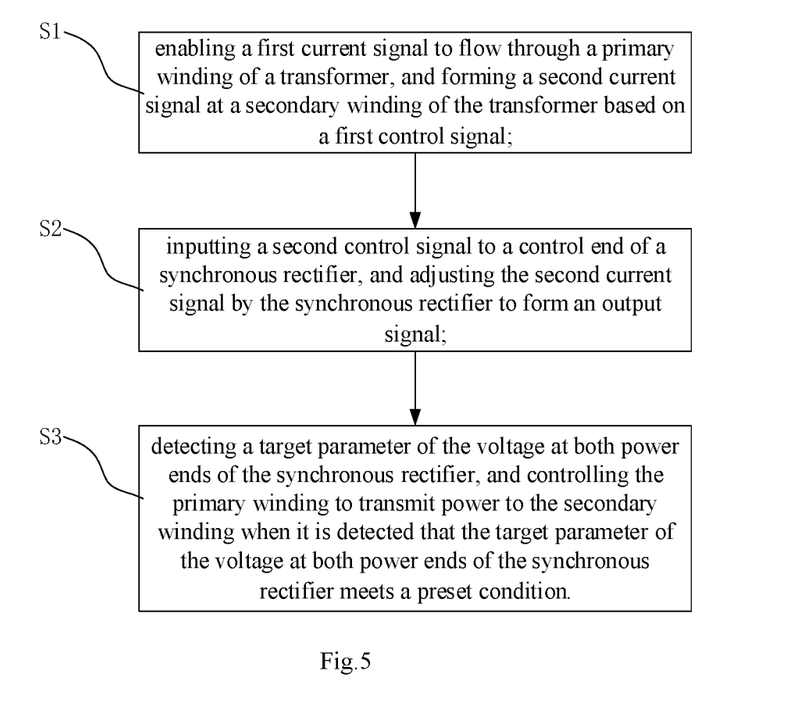
FIG. 5 shows a flow block diagram of a switching-type regulation driving method according to an embodiment of the present disclosure.

FIG. 5 shows a flow block diagram of a switching-type regulation driving method according to an embodiment of the present disclosure.

As shown in FIG. 5, in this embodiment, the switching-type regulation driving method can be applied to the switching-type regulation driver described in FIGS. 2 to 3, and includes performing steps S1 to S3.

Specifically, in step S1, a first current pulse flows through the primary winding of the transformer, and a second current pulse is formed on the secondary winding of the transformer based on a first control signal.

Referring to FIG. 2, a first current pulse is generated based on the input voltage Vin, and a controller U1 outputs a high-level first control signal GT_PSR to control the the first transistor Q1 to be turned on, so that the first current pulse may flow through the primary winding $N_P$ of the transformer TR, the first transistor Q1 and a current sensing resistor $R_S$ to form a current loop, thereby forming the second current pulse by induction on the secondary winding $N_S$ of the transformer TR.

In step S2, the second control signal is input to the control end of the synchronous rectifier, and the synchronous rectifier rectifies the second current pulse to form an output voltage.

After the second current pulse is formed by induction on the secondary winding $N_S$, a second control signal GT_SR is output by the drive control module 20 to control the intermittent on-off of the synchronous rectifier Q2. After the second current pulse is synchronously rectified, the output voltage Vo is formed at both ends of the output capacitor Co.

In step S3, the target parameter of the voltage across both power ends of the synchronous rectifier is detected, and when it is detected that the target parameter of the voltage across both power ends of the synchronous rectifier meets a preset condition, the controller is triggered to control the primary winding to transmit power to the secondary winding.

In one embodiment of the present disclosure, detecting the target parameter of the voltage across both power ends of the synchronous rectifier, and triggering the controller to control the primary winding to transmit power to the secondary winding when it is detected that the target parameter of the voltage across both power ends of the synchronous rectifier meets a preset condition including: detecting the voltage amplitude of the voltage across both power ends of the synchronous rectifier, and triggering the controller to control the primary winding to transmit power to the secondary winding when it is detected that the voltage amplitude of the voltage across both power ends of the synchronous rectifier is lower than or equal to a first threshold.

In another embodiment of the present disclosure, detecting the target parameter of the voltage across both power ends of the synchronous rectifier, and triggering the controller to control the primary winding to transmit power to the secondary winding when it is detected that the target parameter of the voltage across both power ends of the synchronous rectifier meets a preset condition including: detecting the falling slope of the voltage across both power ends of the synchronous rectifier, and triggering the controller to control the primary winding to transmit power to the secondary winding when it is detected that the falling slope of the voltage across both power ends of the synchronous rectifier is greater than a second threshold.

Furthermore, triggering the controller to control the primary winding to transmit power to the secondary winding includes: generating a third control signal having a first frequency, and forming a third current pulse at the secondary winding based on the third control signal; forming an induced current at the auxiliary winding of the transformer based on the third current pulse, and forming a trigger signal to the controller based on the induced current; triggering the controller by the trigger signal to control the current loop where the primary winding is located to be turned on and to transmit power to the secondary winding. In this embodiment, referring to FIG. 2 and FIG. 3, when it is detected that the target parameter of the voltage across both power ends of the synchronous rectifier meets the preset condition, the drive control unit 21 is triggered to generate the third control signal GT_DY having the first frequency to the second transistor Q3, and then an induced voltage is formed at both ends of the auxiliary winding $N_A$ by intermittently turning on/off the second transistor Q3. After the VS pin of the controller U1 senses the corresponding voltage signal, the controller U1 is triggered to begin to provide a first control signal GT_PSR, thereby controlling the primary winding $N_P$ to transmit power/energy to the secondary winding $N_S$, so that the voltage amplitude of the output voltage Vo begins to increase to prevent the output voltage Vo from falling even lower.

In the present disclosure, prior to detecting the target parameter of the voltage across both power ends of the synchronous rectifier, the method also includes: detecting the rising edge of the second control signal, and re-timing every time the rising edge of the second control signal is detected (that is, clearing the current timing value and starting re-timing); triggering the detection to the target parameter of the voltage across both power ends of the synchronous rectifier when the timing value reaches a third threshold. It should be understood that the method may alternatively include: when every time the rising edge of the second control signal is detected, calculating the difference between the timing value at the current time and the timing value at the previous rising edge, and determining whether the difference ends, if yes, resetting the current timing value and beginning re-timing, and triggering the detection to the target parameter of the voltage across both power ends of the synchronous rectifier when the difference reaches a third threshold.

Furthermore, the drive control module 20 stops outputting the third control signal after it is detected that the driver returns to normal work state.

The present disclosure also provides a switching power supply, which includes a switching-type regulation driver as described in FIGS. 2 to 3.

To sum up, according to the present disclosure, a drive control module is provided at the secondary winding end of the driver, and is used to detect the target parameter of the voltage across the both power ends of the synchronous rectifier. In this way, a purpose of indirectly sampling the output voltage information may be achieved, so that the pre-stage chip may be matched with to realize a function of dynamic acceleration, to prevent the output voltage from dropping, and the dependence on the output pin may be reduced, even the number of the output pins may be saved.

It should be noted that in this context, the terms "comprising", "including" or any other variant thereof are intended to cover non-exclusive inclusion, such that a process, a method, an article or a device including a series of elements include those elements, but include other elements not listed clearly, or further include elements inherent to such process, method, article or device. In the case of no more limitations, the element limited by the sentence "comprising a . . . " does not exclude that there exists another same element in the process, method, article or device comprising the element.

Finally, it should be noted that the above embodiments are apparently used for clearly describing examples of the present disclosure rather than limiting to embodiments. A person of ordinary skill in the art may further make other changes or variations in a different form on the basis of the above description. Herein, it is unnecessary or impossible to enumerate all the embodiments. Obvious changes or variations derived based on the same shall still fall within the protection scope of the present disclosure.

What is claimed is:

1. A switching-type regulation driver, comprising:
a transformer having a primary winding and a secondary winding;
a first transistor, wherein a first power end of the first transistor is connected to a dotted terminal of the primary winding, and a second power end of the first transistor is connected to a reference ground through a current sensing resistor;
a controller, connected to a control end and the second power end of the first transistor respectively, wherein the controller generates a first control signal to the control end of the first transistor;
a synchronous rectifier, having power ends respectively connected to a non-dotted terminal of the secondary winding and the reference ground;
a drive control module, connected to the control end of the synchronous rectifier and the non-dotted terminal of the secondary winding respectively,
wherein, the drive control module is connected to the power end of the synchronous rectifier that is connected to the non-dotted terminal of the secondary winding for detecting a target parameter of a voltage across both power ends of the synchronous rectifier when the synchronous rectifier disconnects a conductive path between the non-dotted terminal of the secondary winding and the reference ground, and when it is detected that the target parameter of the voltage at across both power ends of the synchronous rectifier meets a preset condition, the controller controls a switching action of the first transistor so that the primary winding transmits power to the secondary winding.

2. The switching-type regulation driver according to claim 1, wherein the driver further includes an auxiliary winding, wherein a voltage signal at both ends of the auxiliary winding is divided by a voltage dividing resistor to generate a voltage dividing signal, and the voltage dividing signal is transmitted to the controller,
the controller controls the switching action of the first transistor according to information of the voltage dividing signal.

3. The switching-type regulation driver according to claim 2, wherein the drive control module includes:
a second transistor and a first resistor, wherein the second transistor and the first resistor are successively connected in series between the non-dotted terminal of the secondary winding and the reference ground;
a sampling unit, connected to the non-dotted terminal of the secondary winding through the pin, and used to sample a voltage between the both power ends of the synchronous rectifier to obtain the voltage across both power ends of the synchronous rectifier;
a drive control unit, connected to the sampling unit, the control end of the synchronous rectifier and the control end of the second transistor respectively, to provide a second control signal to the synchronous rectifier, and to provide a third control signal to the second transistor according to the voltage across both power ends of the synchronous rectifier.

4. The switching-type regulation driver according to claim 3, wherein the drive control unit includes:
a control signal generator, including a first output end for providing the second control signal, and a second output end for providing the third control signal, and a driver, receiving the second control signal to generate a drive signal to drive the synchronous rectifier.

5. The switching-type regulation driver according to claim 1, wherein the target parameter of the voltage across both power ends of the synchronous rectifier is a voltage amplitude of the voltage across both power ends of the synchronous rectifier, and the preset condition is that the voltage amplitude is lower than or equal to a first threshold.

6. The switching-type regulation driver according to claim 5, wherein the first threshold is a preset fixed value; or the first threshold is adaptively adjusted following the voltage across both power ends of the synchronous rectifier.

7. The switching-type regulation driver according to claim 6, wherein when the first threshold is adaptively adjusted following the voltage across both power ends of the synchronous rectifier, the drive control module further includes:
a sampling filter holding unit, connected to the non-dotted terminal of the secondary winding to sample and filter the voltage between the both power ends of the synchronous rectifier to obtain an average value of the voltage across both power ends of the synchronous rectifier after sampling filter;
a proportion adjustment unit, connected to the sampling filter holding unit and the drive control unit respectively, to obtain the first threshold according to the average value of the voltage across both power ends of the synchronous rectifier and a preset proportionality coefficient,
wherein, the first threshold is the product of the average value and the preset proportionality coefficient, the preset proportionality coefficient is recorded as K %, wherein K is greater than or equal to 80 and less than 100.

8. The switching-type regulation driver according to claim 1, wherein the target parameter of the voltage across both power ends of the synchronous rectifier is a falling slope of the voltage across both power ends of the synchronous rectifier, and the preset condition is that the falling slope is greater than a second threshold.

9. The switching-type regulation driver according to claim 3, wherein the drive control module further includes:
a timing unit, connected to the drive control unit for re-timing every time a rising edge of the second control signal is detected, and used to trigger the drive control module to detect the target parameter of the voltage across both power ends of the synchronous rectifier when a timing value reaches a third threshold.

10. A switching-type regulation driving method, wherein the switching-type regulation driving method is applied to the switching-type regulation driver according to any one of claim 1, the method includes:
enabling a first current signal to flow through the primary winding of a transformer, and forming a second current signal at a secondary winding of the transformer based on a first control signal;
inputting a second control signal to a control end of the synchronous rectifier, and adjusting the second current signal by the synchronous rectifier to form an output signal;
wherein the method further includes:
detecting the target parameter of the voltage across both power ends of the synchronous rectifier, and controlling the primary winding to transmit power to the secondary winding when it is detected that the target parameter of the voltage across both power ends of the synchronous rectifier meets a preset condition.

11. The switching-type regulation driving method according to claim 10, wherein detecting the target parameter of the voltage across both power ends of the synchronous rectifier, and controlling the primary winding to transmit power to the secondary winding when it is detected that the target parameter of the voltage across both power ends of the synchronous rectifier meets the preset condition includes:
detecting a voltage amplitude of the voltage across both power ends of the synchronous rectifier, and controlling the primary winding to transmit power to the secondary winding when it is detected that the voltage amplitude of the voltage across both power ends of the synchronous rectifier is lower than or equal to a first threshold.

12. The switching-type regulation driving method according to claim 10, wherein detecting the target parameter of the voltage across both power ends of the synchronous rectifier, and controlling the primary winding to transmit power to the secondary winding when it is detected that the target parameter of the voltage across both power ends of the synchronous rectifier meets a preset condition includes:
detecting a falling slope of the voltage across both power ends of the synchronous rectifier, and controlling the primary winding to transmit power to the secondary winding when it is detected that the falling slope of the voltage across both power ends of the synchronous rectifier is greater than a second threshold.

13. The switching-type regulation driving method according to claim 10, wherein controlling the primary winding to transmit power to the secondary winding includes:
generating a third control signal having a first frequency, and forming a third current signal at the secondary winding based on the third control signal;
forming an induced current at an auxiliary winding of the transformer based on the third current signal, and forming a trigger signal to the controller based on the induced current;
triggering the controller by the trigger signal to control the first transistor on, so that a current circuit where the primary winding is located is turned on, and power is transmitted to the secondary winding based on a principle of electromagnetic induction.

14. The switching-type regulation driving method according to claim 10, wherein prior to detecting the target parameter of the voltage across both power ends of the synchronous rectifier, the method further includes:
detecting a rising edge of the second control signal, and re-timing every time the rising edge of the second control signal is detected;
triggering to detect the target parameter of the voltage across both power ends of the synchronous rectifier when a timing value reaches a third threshold.

* * * * *